Patented Oct. 20, 1925.

1,558,096

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

VULCANIZER.

Application filed April 24, 1925. Serial No. 25,487.

*To all whom it may concern:*

Be it known that I, OTTO J. KUHLKE, a citizen of the United States, and a resident of Akron, county of Summit, and State of Ohio, have invented certain new and useful Improvements in Vulcanizers, of which the following is a specification.

The present invention relates to a vulcanizer of the steam chambered type adapted for the manufacture of pneumatic automobile tires. The vulcanizer is of the hinged variety supported vertically so that it can be opened easily and the tire placed therein in vertical position. For convenience, the vulcanizer is made in two parts or a duplex type.

The invention in its preferred form is illustrated in the drawings forming a part of the present application, it being understood that exact conformity with the details of the device is not essential, variations being possible within the scope of the invention as set forth in the appended claims.

Figure 1:
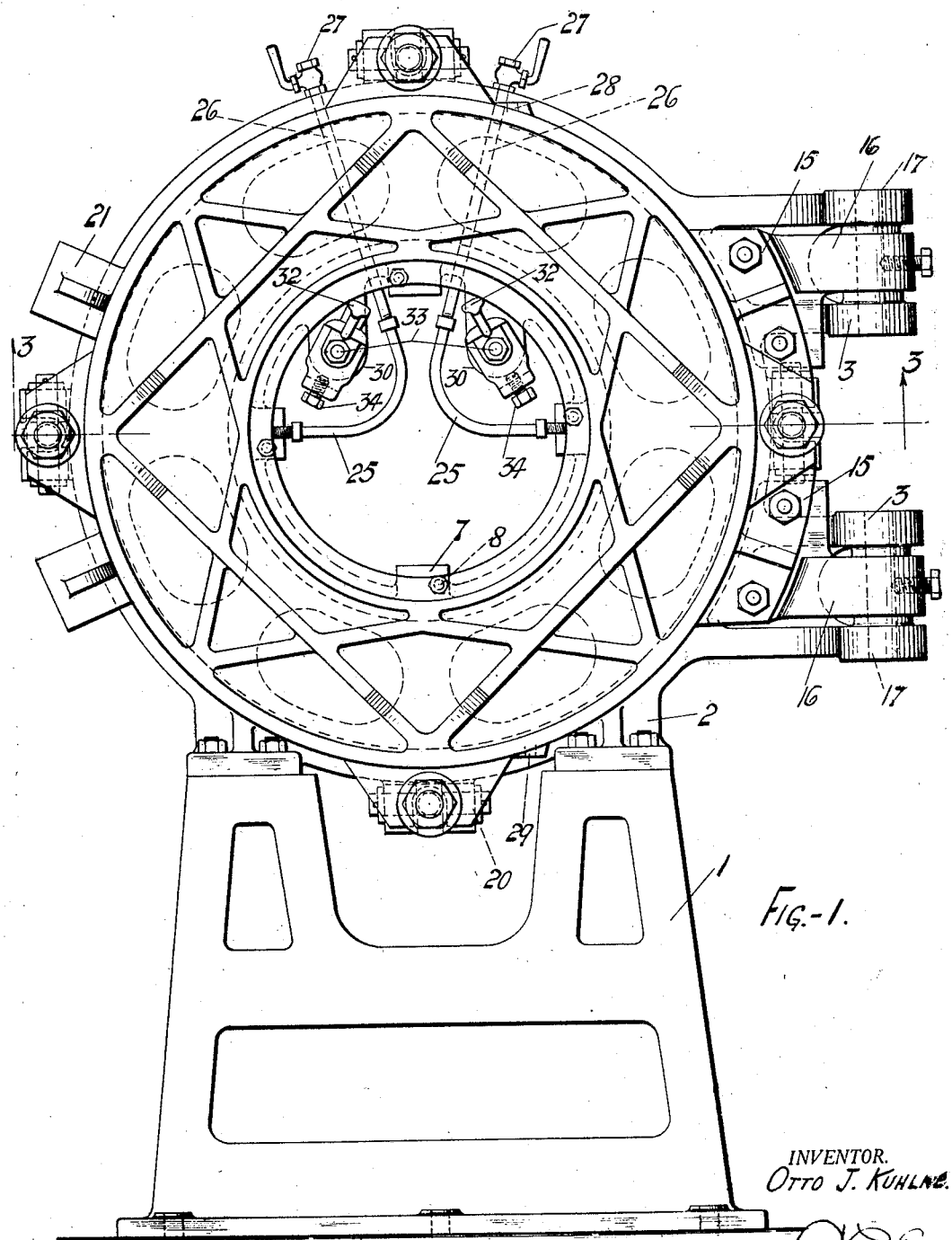
Figure 1 is a front elevation of the mechanism.
Figure 2:
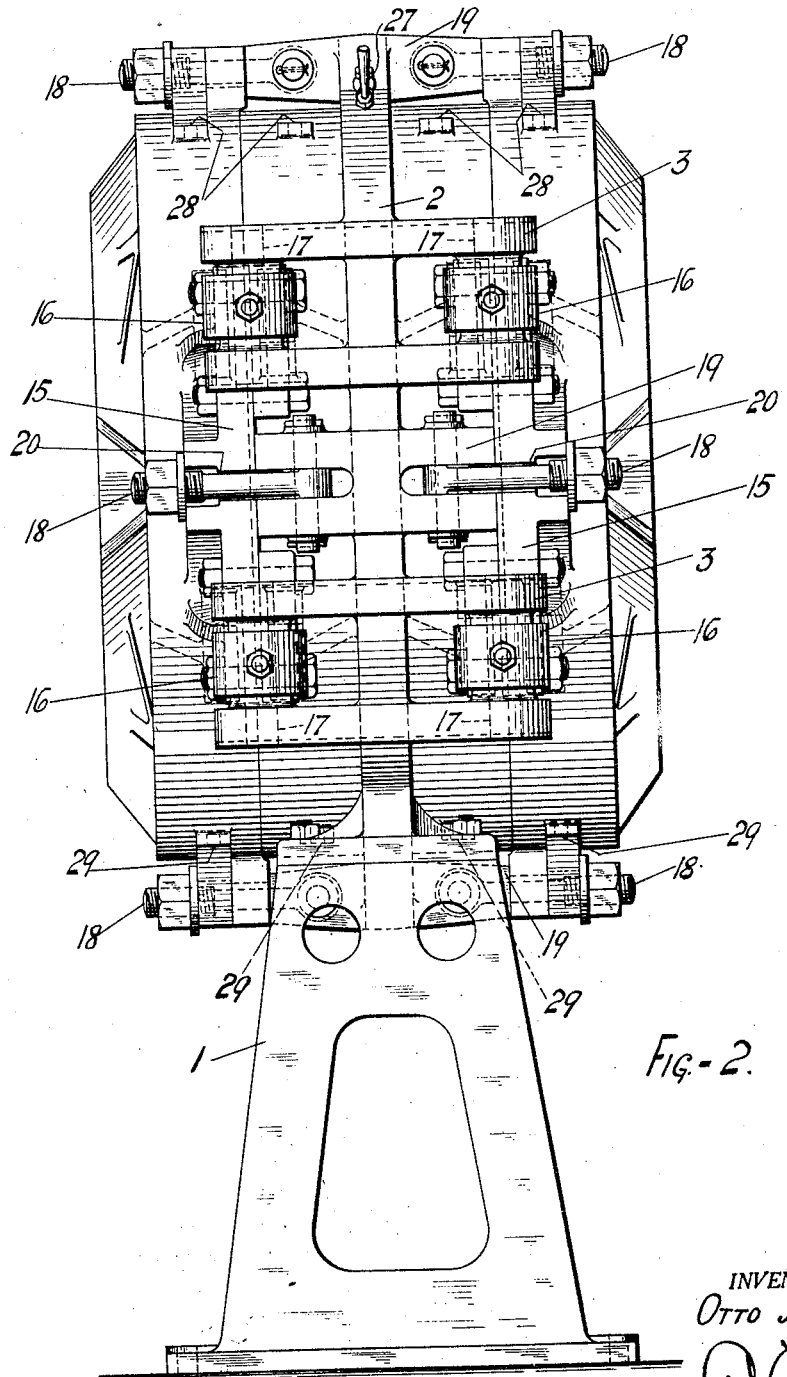
Figure 2 is an end elevation.

The device of the present invention comprises a heavy casting or base member 1, to the upper surface of which is bolted a vertical web or central casting 2 which extends upwardly between the two tire molding units. The main portion of the central web is circular in side elevation, but is formed with laterally extending parallel arms 3 arranged in two pairs on either side of the central casting which form parts of the hinges of the outer swinging mold sections.

The complete mold units are alike on either side of the central web, being arranged in this manner for the sake of economy in floor space and to obtain a balance on either side of the central web. Each mold comprises a chambered or steam jacketed casting 4, the outer surface of which is provided with a rib 5 adapted to seat against a circular shoulder 6 on the central supporting web. The stationary mold section is provided with a suitable number of lugs 7 through which pass bolts 8 which secure the stationary mold section to the central casting. The chamber 9 within the casting forms a space for the circulation of steam. The outer face of the casting is formed with one side of the tire molding recess and with a circular ledge 10 to receive one side of the usual bead forming rings 11.

Figure 3:
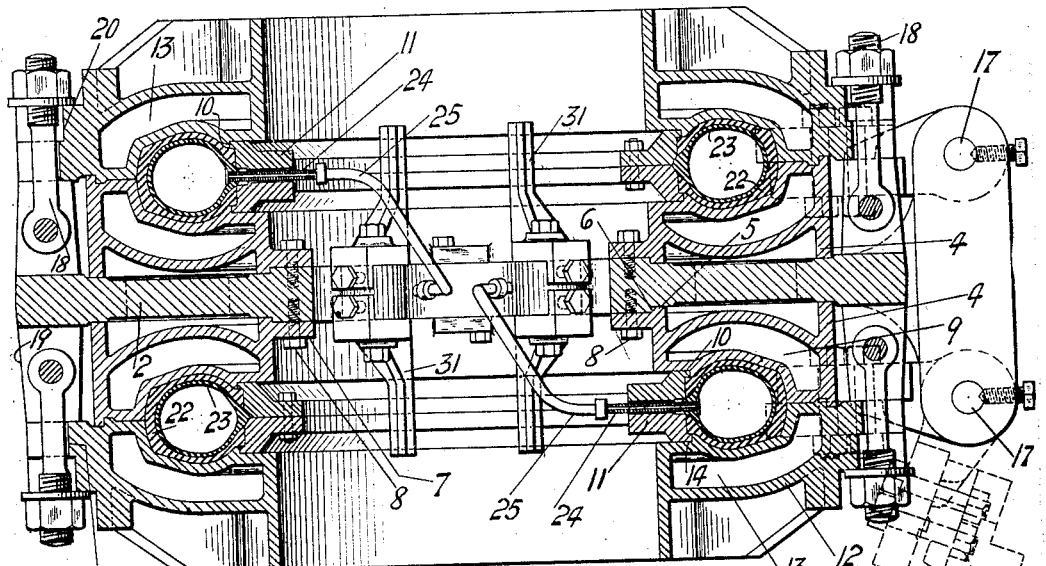
Figure 3 is a horizontal section on the line 3—3, looking upward.
Figure 4:
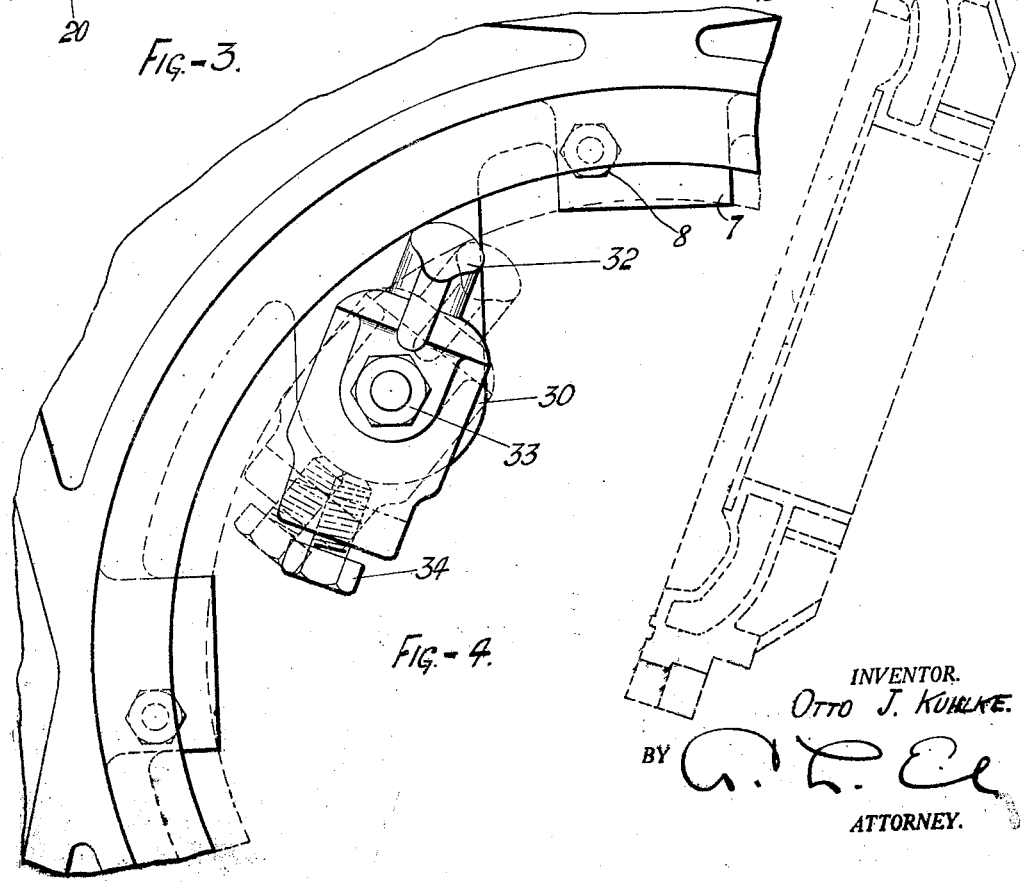
Figure 4 is a detail of one of the tire supporting rings.

The other half of the mold is formed by a somewhat similar chambered mold section 12 with the chamber 13 for the circulation of steam, the molding surface for the tire and a ledge 14 similar to the ledge 10. The outer mold section is arranged to swing outwardly, as shown in dotted lines in Figure 3, being, for this purpose, provided with short segmental flanges 15 which are bolted to swinging arms 16 mounted on vertical pivots 17 in the arms 3. When the molds are closed they are locked securely by means of swinging bolts 18, pivoted upon lugs 19 formed on the web 2, and passing through notched ears 20 on the swinging mold section. Oppositely positioned lugs 21 on the stationary and swinging mold sections afford means for prying the mold sections apart.

A tire 22 is shown in position within the mold cavity, being mounted upon the curing rings 11 in the usual manner. The usual expansible air bag 23 is shown within the tire, the valve 24 of the air bag being connected to a flexible hose 25, the hose in turn connecting with a rigid pipe 26. The pipes 26 for the two molding units pass radially through the casting 2 and are connected to a suitable source of pressure controlled by valves 27. 28 indicates steam inlets for the chambered molds and 29 suitable drainage ports.

In order to support the tire and curing rings within the mold preparatory to closing, the web 2 is formed with oppositely positioned lugs 30, the lower surfaces of which are semi-circular. On each lug is positioned an arm 31 having an eccentric extension 32 which serves as a support for the curing rings each arm is adjustable about a central bolt 33, a radial set screw 34 serving to further secure the arm in position. By adjusting the arms toward or from the center of the mold, different sizes of bead rings may be accommodated in the device, thus giving a large range of tires which may be cured.

When it is desired to change the equipment for the vulcanization of different sizes of tires, the chambered mold sections may be readily removed and others secured in their place. By the arrangement here shown and described, a single unit may be used for different sizes of tires.

The apparatus is simple and easy of adjustment for use in factories having large or small production. It may be quickly adapted for rapid and economical production and has other advantages apparent to those skilled in the art. The tire assembly, comprising the tire, bead rings and air bag, are easily inserted within the mold.

What is claimed is:

1. An apparatus for the vulcanization of tires comprising a central vertical supporting web, two stationary chambered mold sections secured to either side of the web, and hinged chamber mold sections adapted to swing against the stationary mold sections.

2. An apparatus for the vulcanization of tires comprising a central vertical supporting web, two stationary chambered mold sections secured to either side of the web, chambered mold sections hinged to the web and adapted to swing against the stationary mold sections, and locking devices carried by the web for clamping the mold sections together.

3. In a vertical mold of the swinging type, a support, a stationary mold section attached to the support, a swinging mold section hinged upon the support, and lateral arms to carry a tire assembly within the mold, the arms being adjustable to support tire assemblies of different internal diameters.

4. In a vertical mold, a support, a stationary mold section attached to the support, a movable mold section, and lateral arms carried by the support to hold a tire assembly within the mold, the arms being adjustable to support assemblies of different internal diameters.

5. In a vertical mold, a support, a stationary mold section attached to the support, a movable mold section, and lateral arms carried by the support to hold a tire assembly within the mold, the arms being rocked toward and from one another to accommodate different diameters of tire assemblies.

OTTO J. KUHLKE.